Sept. 17, 1957 J. B. VAN DER WERFF 2,806,756
RECORDING APPARATUS
Filed Jan. 28, 1952
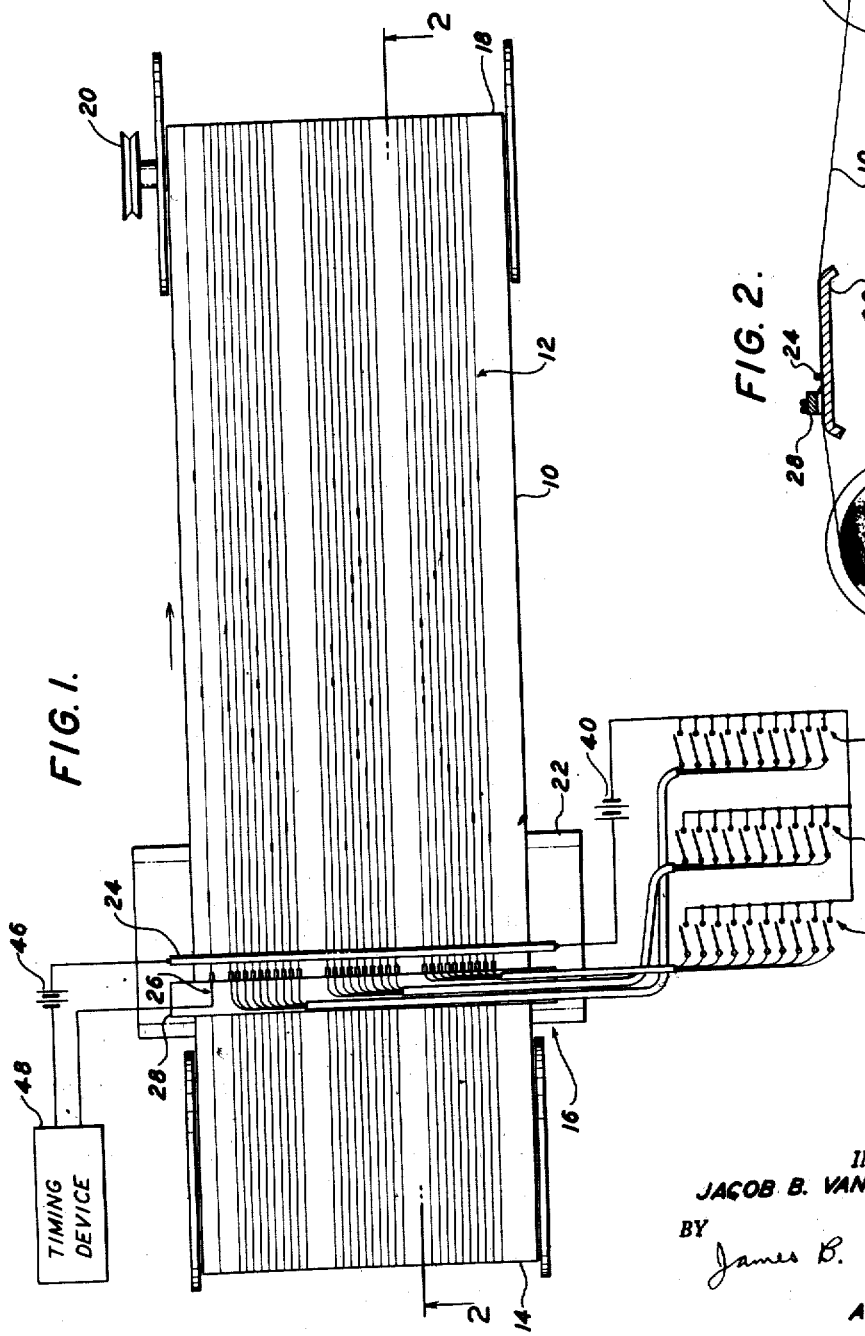
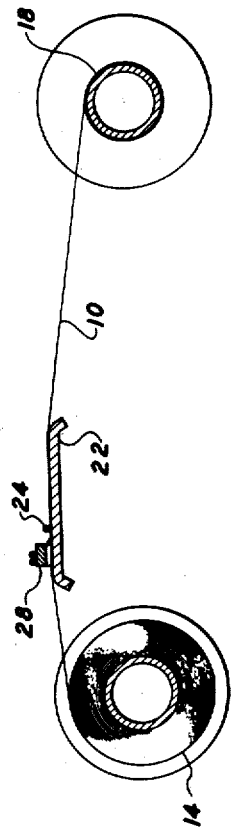
INVENTOR.
JACOB B. VAN DER WERFF
BY James B. Christie
ATTORNEY

United States Patent Office 2,806,756
Patented Sept. 17, 1957

2,806,756

RECORDING APPARATUS

Jacob V. Van Der Werff, Burbank, Calif., assignor, by mesne assignments, to Consolidated Electrodynamics Corporation, Pasadena, Calif., a corporation of California Application January 28, 1952, Serial No. 268,637

3 Claims. (Cl. 346—74)

This invention relates to an arrangement for recording information on a recording medium such as a strip of paper with pulses of electric current.

Co-pending application Serial No. 199,995 filed on December 9, 1950, by Harry E. Burke discloses a method and apparatus for recording digital information with pulses of electric current. The recording medium employed in the arrangement disclosed by Burke is electrolytically sensitive paper which provides a mark on its surface in response to small electric currents passed through the paper. Such recording paper is conductive and it is of high resistance. It has been found that such electrolytically sensitive papers are affected by moisture and humidity so that clean, easily readable records cannot be obtained if the recording paper becomes moist.

This difficulty is overcome in the present invention by employing a non-conductive recording paper having parallel lines composed of a conductive material extending longitudinally along one side of the recording paper. The conductive material of the lines is a type which changes color or exposes an undercoating of a different color and becomes non-conductive upon passage of an electric current through the conductive material, or when the conductive material is heated. The number of lines employed is determined by the required accuracy of the information to be recorded, and it is preferable that the lines be closely spaced so as to facilitate visual interpretation of the recorded information.

Each conductive line on the paper represents a number, and information is recorded by causing small portions of the various lines to change in color and become non-conductive in accordance with numerical information to be recorded.

In a preferred embodiment of the apparatus, the recording paper is caused to move past a recording head at a substantially constant speed, and pulses of electric current are applied to small portions of the various lines in accordance with the numerical information to be recorded. The recording head employs a conductor which contacts all of the conductive lines and which extends transversely to the direction of movement of the paper. A plurality of conductive members, such as styli, which contact the respective lines are located adjacent to and extend along an axis parallel to the conductor. Numerical information is recorded by causing pulses of current to flow between the appropriate styli and the conductor through the portions of the lines which lie between the selected styli and the conductor.

The records produced in accordance with my invention are clean and easy to read because the marks representing numerical information are confined to the respective lines on the recording paper and hence the marks are not blurred if the paper becomes moist. The conductive lines may be composed of material having a low resistance so that the effects of moisture and humidity are negligible.

The records may be read visually or by an automatic reader employing photo-sensitive pickups or employing a current conducting pickup of the same general type as the recording head.

The invention is explained with reference to the drawings, in which:

Fig. 1 is a plan view of the recording device showing the electric pulse generating apparatus schematically; and Fig. 2 is a sectional view of the recording apparatus along line 2—2 of Fig. 1.

The recording medium shown in Fig. 1 is a strip of paper 10 having a plurality of parallel lines 12 printed on one side of the paper. The lines 12 are composed of a conductive material which changes in color and becomes non-conducting upon passage of an electric current through the material. The conductive material which the lines are composed of may be a metallic or carbon material secured by a suitable binder. For example, silver conducting paint may be employed in the lines. Such lines turn black and become nonconductive when the silver oxidizes due to the heat developed when an electric current is caused to flow through the material.

The recording paper is pulled from a feed roll 14 and past a recording head 16 by a take-up roll 18 which is rotated by a suitable motor (not shown) coupled to a pulley 20. A member 22 having a flat surface supports the recording paper as it passes under the recording head.

The recording head comprises a conductor 24 which contacts all of the lines 12 and which extends at a right angle with respect to the direction of movement of the recording paper, and a plurality of conductive members or styli 26 which contact the respective lines 12 and which extend along an axis which is parallel to the conductor 24. The styli 26 are supported by a member 28 so that they are electrically insulated from one another.

As shown in Fig. 1, three sets of ten lines and one timing line are provided on the recording paper. The ten lines in each set represent the numbers 1 to 10, and since three sets of lines are provided, three numbers can be recorded simultaneously.

Numerical information is recorded by selectively causing current to flow from a source of potential 40 through small portions of the various lines which represent the numbers to be recorded. One terminal of the source of potential 40 is connected directly to the conductor 24, and three sets of switches 42 to 44 are shown for connecting the other terminal of the source of potential 40 to the various styli. Thus, when one or more of the switches are closed, the battery 40 is connected between the conductor 24 and the styli which are connected to the closed switches, so that electric current flows through the portions of the lines which lie between the energized styli and the conductor 24. The electric current causes these portions of the lines to change in color and become non-conducting.

Timing marks are recorded in a similar manner by means of the electric current provided by a source of potential 46 through a suitable timing device 48 which periodically closes the circuit between the source of potential and the stylus which contacts the timing line on the recording paper.

For automatic operation, the switches 42 to 44 and the timing device 48 may be electronic apparatus which serves to provide the required current pulses. The aforesaid application by Burke discloses one type of electronic apparatus which may be employed to produce the required current pulses.

The recorded information on the record shown in Fig. 1 is a numerical representation of the variation in the amplitude of half of a sine wave with respect to time. The variations in the amplitude of the sine wave are recorded to three decimals, with the bottom set of lines showing the first number of the decimal, the middle set showing the second number of the decimal, and the upper set showing the third number. Thus, the initial amplitude which is recorded is the decimal 0.174.

The general shape of the wave form of the recorded information can be determined by visual inspection of the information which is recorded in the lower set of lines.

If the conductive material of the lines on the recording paper changes in color and becomes non-conductive merely upon being heated, the conductor 24 and the styli 26 may be spaced a short distance from the lines 12 and information may be recorded by causing a spark to pass between the selected styli and the conductor 24.

Automatic readers may be employed to read the information which is recorded in accordance with my invention. For example photo-sensitive pickups may be employed to scan each line, or a current conducting pickup of the same type as the recording head shown in Fig. 1 may be employed. Such automatic readers may be employed with computers or other recording devices.

I claim:

1. Apparatus for recording digital information comprising a strip of non-conductive material having a plurality of parallel lines printed thereon and extending longitudinally therealong, the lines composed of a conductive material which changes in color and becomes non-conducting upon passage of an electric current therethrough, means for moving the strip along its longitudinal axis, a plurality of conductive members contacting the respective lines on said strip along a common axis disposed transverse to the direction of movement of the strip, a conductor on the same side of the sheet as the conductive members contacting the lines on said strip along an axis adjacent and parallel to the axis of the conductive members, and means for connecting a source of potential between said conductor and selected members of said plurality of conductive members.

2. Apparatus for recording information comprising an elongated strip of non-conductive material, a plurality of parallel conductors secured to and extending longitudinally along the strip, said conductors composed of a material that changes its physical characteristics when heated, and recording means on the same side of the sheet as the conductors for selectively heating small longitudinal portions of said conductors, said recording means heating the entire portion of the respective conductors along each longitudinal portion which is selected so that substantially the entire conductor changes its physical characteristics in the respective areas which are selected, and said recording means including a plurality of separated conductive members contacting the respective conductors on said strip whereby the selectively heated portions of said conductors represent a particular bit of information.

3. Apparatus for recording digital information comprising a strip of non-conductive material having a plurality of parallel lines printed thereon and extending longitudinally therealong, the lines composed of a material that changes its physical characteristics when heated, a plurality of conductive styli contacting the respective lines on said strip along a common axis disposed transverse to the direction of movement of the strip, a common conductor on the same side of the sheet as the conductive styli contacting the lines on said strip along an axis adjacent and parallel to the axis of the conductive styli, and means for connecting a source of potential between said conductor and selected members of said plurality of conductive styli.

References Cited in the file of this patent

UNITED STATES PATENTS

| | | |
|---|---|---|
| 1,825,551 | Serrell | Sept. 29, 1931 |
| 1,954,955 | Siebers | Apr. 17, 1934 |
| 2,303,472 | Johnston | Dec. 1, 1942 |
| 2,606,807 | Pessel | Aug. 12, 1952 |

UNITED STATES PATENT OFFICE

CERTIFICATE OF CORRECTION

Patent No. 2,806,756

September 17, 1957

Jacob B. Van Der Werff

It is hereby certified that error appears in the above numbered patent requiring correction and that the said Letters Patent should read as corrected below.

In the grant, line 1, and in the heading to the printed specification, line 3, name of inventor, for "Jacob V. Van Der Werff", each occurrence, read -- Jacob B. Van Der Werff --.

Signed and sealed this 26th day of November 1957.

(SEAL)
Attest:

KARL H. AXLINE
Attesting Officer

ROBERT C. WATSON
Commissioner of Patents